(12) United States Patent
Gely et al.

(10) Patent No.: US 8,091,232 B2
(45) Date of Patent: Jan. 10, 2012

(54) DEVICE AND METHOD FOR OPERATING IN A WATER CHAMBER OF A HEAT EXCHANGER

(75) Inventors: Marc Gely, Fontaines (FR); Philippe Jambon, Moncenis (FR); Christophe Parize, Jambles (FR)

(73) Assignee: Areva NP, Courbevoie (FR)

( * ) Notice: Subject to any disclaimer, the term of this patent is extended or adjusted under 35 U.S.C. 154(b) by 1325 days.

(21) Appl. No.: 11/616,065

(22) Filed: Dec. 26, 2006

(65) Prior Publication Data

US 2007/0153957 A1 Jul. 5, 2007

(30) Foreign Application Priority Data

Dec. 29, 2005 (FR) ...................................... 05 13471

(51) Int. Cl.
*B21D 53/02* (2006.01)
(52) U.S. Cl. ........... 29/890.03; 29/26 B; 29/726; 29/727
(58) Field of Classification Search .................... 29/726, 29/727, 26 B
See application file for complete search history.

(56) References Cited

U.S. PATENT DOCUMENTS

| | | | |
|---|---|---|---|
| 3,934,731 A | 1/1976 | Muller et al. | |
| 4,216,893 A | 8/1980 | Glatthorn | |
| 4,329,769 A * | 5/1982 | Glatthorn | 483/53 |

FOREIGN PATENT DOCUMENTS

FR 2 211 721 7/1974

OTHER PUBLICATIONS

G. Schucktanz, "Optimization of Steam Generator Performance," vol. 51, No. 4, Dec. 1987, Munchen, Germany, pp. 223-227.

\* cited by examiner

*Primary Examiner* — Derris Banks
*Assistant Examiner* — Azm Parvez
(74) *Attorney, Agent, or Firm* — Connolly Bove Lodge & Hutz LLP

(57) ABSTRACT

The invention relates to a device (10) for operating in a water chamber (7) of a heat exchanger (1) comprising a wall (6) of substantially hemispherical shape and, at its upper portion, a tube plate (5) traversed by a plurality of vertical holes (4). The device comprises at least one rail (11) furnished with members for attachment on the bottom face of the tube plate (5) and supporting at least one trolley (15) that can be moved along the said rail (11) and fitted with a pendular lifting means (19) and a robotic arm (20) comprising an attachment base (30) furnished with members for coupling on the bottom face of the tube plate (5) and a drive means interacting with the lifting means (19) to draw the attachment base (30) against the tube plate (5).

The invention applies more particularly to the steam generator of a pressurized water nuclear reactor.

11 Claims, 6 Drawing Sheets

DEVICE AND METHOD FOR OPERATING IN A WATER CHAMBER OF A HEAT EXCHANGER

This application claims priority under 35 U.S.C. §119(a) on Patent Application No. 0513471 filed in France on Dec. 29, 2005, the entire contents of which is hereby incorporated by reference.

The present invention relates to a device and a method for operating in a water chamber of a heat exchanger and, in particular, of a steam generator of a pressurized water nuclear reactor.

Pressurized water nuclear reactors comprise a primary circuit in which the pressurized cooling water of the nuclear reactor circulates, that usually consists of several loops on each of which is placed a steam generator providing, by heat exchange between the pressurized cooling water of the nuclear reactor and the feedwater, the heating and vaporization of the feedwater, so as to produce the steam that is sent to a turbine of the power station. The steam generators of pressurized water nuclear reactors comprise a generally cylinder-shaped barrel placed with its axis vertical in which are placed a bundle of heat exchange tubes and a water chamber of substantially hemispherical shape constituting the lower portion of the steam generator, beneath the barrel enclosing the bundle.

A very thick tube plate, placed horizontally and traversed by holes in a vertical direction, disposed in an array, provides the separation between the upper portion of the steam generator and the water chamber. The tubes of the steam generator bundle are engaged and attached in a sealed manner via their end portions in the holes of the tube plate. The water chamber is delimited, on the one hand, by the hemispherical wall forming the lower portion of the steam generator barrel and, on the other hand, by the lower horizontal surface of the tube plate on which emerge the holes for passing and attaching the tubes of the bundle.

Each of the tubes of the bundle is bent at its upper portion and has two rectilinear branches whose ends are engaged in the holes traversing the tube plate either side of a partition plate separating the water chamber into two compartments each connected, by a pipe, to a duct of the primary circuit, so that the cooling water of the reactor enters the water chamber inside one of the compartments in order to be fed into each of the tubes of the bundle.

The pressurized cooling water circulating inside the tubes of the bundle is retrieved in the second compartment of the water chamber to be collected by a duct of the primary circuit connected to the second compartment of this water chamber.

In order to be able to access the water chamber, the hemispherical barrel of this water chamber is traversed by an entry hatch or manhole, in each of the two portions of the hemispherical barrel delimiting one compartment of the water chamber.

During the operation of the nuclear reactor, the tube plate, the partition plate and the wall of the heat exchange tubes of the steam generator bundle are subjected to mechanical and thermal stresses. The same applies to the welding zones between the tube plate and the partition plate.

After a certain operating time, these stresses may cause the appearance of fissures or the beginnings of fissures that must be detected in order to prevent any leakage of pressurized cooling water in the inner volume of the steam generator barrel into which the feedwater is inserted and so that they cannot impair the integrity of the pressurized barrel if the fissures should spread.

It is therefore necessary periodically, for example during scheduled shutdowns of the nuclear power station to reload the reactor tank with fuel assemblies, to carry out inspections of the steam generator tubes and of the zones of connection between the tube plate and the partition plate.

If fissures or beginnings of fissures are detected, an operation must be carried out to prevent the risks of leakage or compromise of the integrity of the pressure vessel when returning the steam generator to operation.

The inspections and operations may be carried out by operators working inside the water chamber of the steam generator.

This technique has the disadvantage of causing the operators to work in a highly radioactive zone containing deposits of activated materials that are brought into the water chamber by the nuclear reactor cooling water circulating in contact with the fuel assemblies of the core. Because of this, the doses received by the operators may be considerable, even in the case of operations carried out extremely quickly with each operator being present for a very short time inside the water chamber of the steam generator.

It is therefore necessary to have a large number of operators carry out the operation in order to limit the doses that they receive.

To prevent the disadvantages associated with the necessity to have operators enter the water chamber, it is a known practice to use devices controlled remotely from outside the water chamber to carry out the inspection operations and to perform the various operations for example to remove the fissures or the beginnings of fissures or for any other operation.

These remote operation devices make it possible to reduce the time during which operators are in the water chamber of the steam generator or even to remove the need to have operators operate in the water chamber.

Accordingly, a robot arm of the anthropomorphic type is known that is inserted into the water chamber through the entry hatch and comprises a coupling portion attached to the wall of the water chamber in the vicinity of this hatch.

Also known are devices for operating in a water chamber of a steam generator that comprises a plate for coupling the device beneath the lower surface of the tube plate and a turret mounted so as to rotate on the coupling plate about an axis perpendicular to the plate, that is to say a vertical axis perpendicular to the tube plate during the operation.

The device also comprises one or two telescopic arms fixedly attached in rotation to the turret so as to be able to rotate about the axis of the turret to sweep across one or two annular zones.

The operating devices used hitherto are, generally speaking, fairly bulky and extremely complex in their structure and require long and difficult operations in particular to insert them and place them in the water chamber of the steam generator.

In addition, these devices are usually designed for specific operations and are not intended to withstand significant forces, particularly during machining operations.

Moreover, the placing of the device inside the water chamber, in an initial phase of the operation, is a complex operation which may require at least one operator to be inside the water chamber.

The object of the invention is therefore to propose a device and a method for operating in a water chamber of a heat exchanger that avoids the aforementioned disadvantages.

The subject of the invention is therefore a device for operating in a water chamber of a heat exchanger comprising a wall of substantially hemispherical shape comprising at least one entry hatch and delimited at its upper portion by a tube plate traversed by a plurality of vertical holes, characterized in that it comprises:

at least one rail furnished with members for attachment on the bottom face of the tube plate and supporting at least one trolley that can be moved along the said rail and fitted with a pendular lifting means, and     a robotic arm comprising an attachment base furnished, on the one hand, with members for coupling on the bottom face of the tube plate either side of the said rail and, on the other hand, with a drive means interacting with the lifting means to draw the attachment base against the tube plate.

According to other features of the invention:

the said at least one rail comprises at least one second rail placed in the extension of the first rail and one second trolley that can be moved along the said rail, and the device comprises a tool-carrier comprising an attachment base furnished, on the one hand, with members for coupling on the bottom face of the tube plate, either side of the said rail, and, on the other hand, a drive means interacting with the lifting means to draw the attachment base against the tube plate,     the said attachment members of the said at least one rail are formed by at least two retaining clamps each intended to be inserted into a vertical hole of the tube plate,     the device comprises a ramp for inserting the robotic arm comprising elements for attachment on the outer periphery of the entry hatch and a plate for supporting the robotic arm whose attachment base is placed facing the entry hatch and can be moved on the said ramp,     the attachment base of the robotic arm and of the tool-carrier is formed by a bearing plate of generally parallelepipedic shape comprising a central housing of the drive means and, on two opposite sides, a recess for positioning the rail,     the bearing plate comprises, in at least one recess of one of its sides, two indexing posts each intended to be inserted into a vertical hole of the tube plate,     the coupling members of the bearing plate of each base comprise at least two hydraulic retaining clamps each intended to be inserted into a vertical hole of the tube plate,     the coupling members of the bearing plate of each base comprise four hydraulic retaining clamps each intended to be inserted into a vertical hole of the tube plate, each of the said clamps being placed on a corner of the bearing plate,     the pendular lifting means is formed by a chain or a cable,     the drive means is formed by a wheel rotated by a reducing gear and is furnished with members for engagement with the lifting means, and     the wheel is a gear wheel.

A further subject of the invention is a method of operating in a water chamber of a heat exchanger comprising a wall of substantially hemispherical shape comprising at least one entry hatch and delimited at its upper portion by a tube plate traversed by a plurality of vertical holes, characterized in that:

at least one rail supporting at least one trolley that can be moved along the said rail and is fitted with a pendular lifting means is inserted through the entry hatch into the water chamber,     the said rail is attached on the bottom face of the tube plate,     outside the water chamber, a robotic arm is placed comprising an attachment base furnished, on the one hand, with members for coupling on the bottom face of the tube plate either side of the said rail and, on the other hand, with a drive means interacting with the lifting means,     the attachment base of the robotic arm is placed facing the entry hatch,     the robotic arm is hoisted inside the water chamber by means of the lifting means interacting with the drive means,     the attachment base of the robotic arm is attached in a determined position on the bottom face of the tube plate by the members for coupling in the vertical holes, and     the robotic arm is controlled remotely from outside the water chamber to carry out the various operations inside this water chamber.

According to other features of the invention:

on the one hand, by the action of the drive means interacting with the lifting means and, on the other hand, by means of the trolley, the robotic arm is moved to a new predetermined position to carry out a new series of operations inside the water chamber,     after the attachment base of the robotic arm has been attached on the bottom face of the tube plate:

facing the entry hatch, an attachment base of a tool-carrier is placed furnished with members for coupling on the bottom face of the tube plate either side of the said rail and of a drive means interacting with the lifting means,         the tool-carrier is hoisted inside the water chamber by means of the lifting means interacting with the drive means,         in a determined position, the attachment base of the tool-carrier is attached on the bottom face of the tube plate by the coupling members in the vertical holes, and         the robotic arm is controlled remotely from the outside of the water chamber to carry out, on the one hand, various operations inside this water chamber and, on the other hand, tool-changes necessary to complete the operation, by causing the end of the robotic arm to interact with the tools waiting on the tool-carrier.

The invention will be better understood on reading the following description, given as an example and made with reference to the appended drawings, in which.

Figure 1:
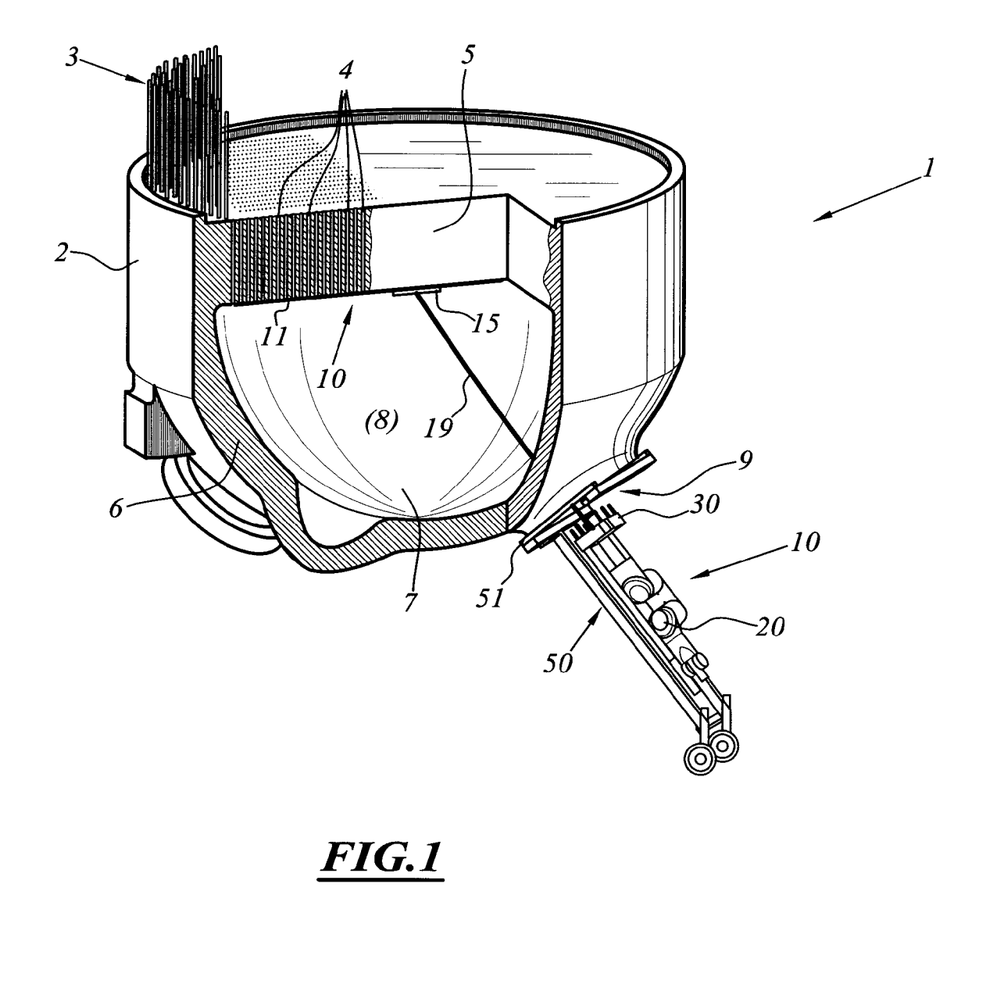
FIG. 1 is a schematic view, in perspective partially cut away, of the lower portion of a steam generator comprising a water chamber in which an operation is carried out by means of a device according to the invention.

FIG. 1 shows the lower portion of a heat exchanger, such as for example a steam generator of a nuclear power station, generally indicated by reference number 1. This steam generator 1 comprises an external barrel 2 of generally cylindrical shape in which is placed a heat exchange bundle consisting of a set of tubes 3.

Each of the tubes 3 of the steam generator heat exchange bundle has, in conventional manner, a U shape and comprises a bent upper portion and two rectilinear branches whose bottom ends are engaged and attached in vertical holes 4 of a tube plate 5 separating the upper portion of the steam generator 1 enclosing the bundle of tubes 3 from a lower portion delimited by a substantially hemispherical wall 6 forming the water chamber 7 of the steam generator 1.

This water chamber 7 is delimited, at its upper portion, by the bottom surface of the tube plate 5.

The water chamber 7 is separated into two compartments by a vertical partition 8 placed in a diametral plane of the tube plate 5 forming a plane of symmetry, either side of which are attached the ends of the rectilinear branches of each of the tubes 3 of the bundle of the steam generator 1.

The partition 8 separates the water chamber 7 into a first and a second compartment that are connected respectively to an inlet duct and outlet duct, not shown, of the cooling water of the pressurized water nuclear reactor which circulates inside the tubes 3 between the inlet compartment and the outlet compartment separated by the partition 8. This partition 8 forms a partition plate which is attached to the bottom surface of the tube plate 5 by continuous weld seams extending along the whole length of the contact between the tube plate 5 and the partition 8.

The sectional plane of FIG. 1 is a plane parallel to the partition 8 so that only one of the two compartments of the water chamber is visible in FIG. 1.

The wall 6 of the water chamber 7 is traversed by an entry hatch 9 or manhole making it possible to access the inside of the compartment of this water chamber 7, for example to carry out inspection, repair, maintenance or machining operations.

Specifically, the entry hatch 9 (FIG. 1) may be used in particular for inserting, into the water chamber 7 of the steam generator, an operating device indicated by the general reference number 10, according to the invention, that may be used to carry out all operations, such as for example inspection, repair, machining or maintenance.

The operating device 10 consists of several independent elements making it possible to insert operating members inside the water chamber 7, and to move these operating members inside the said water chamber 7.

Figure 2:
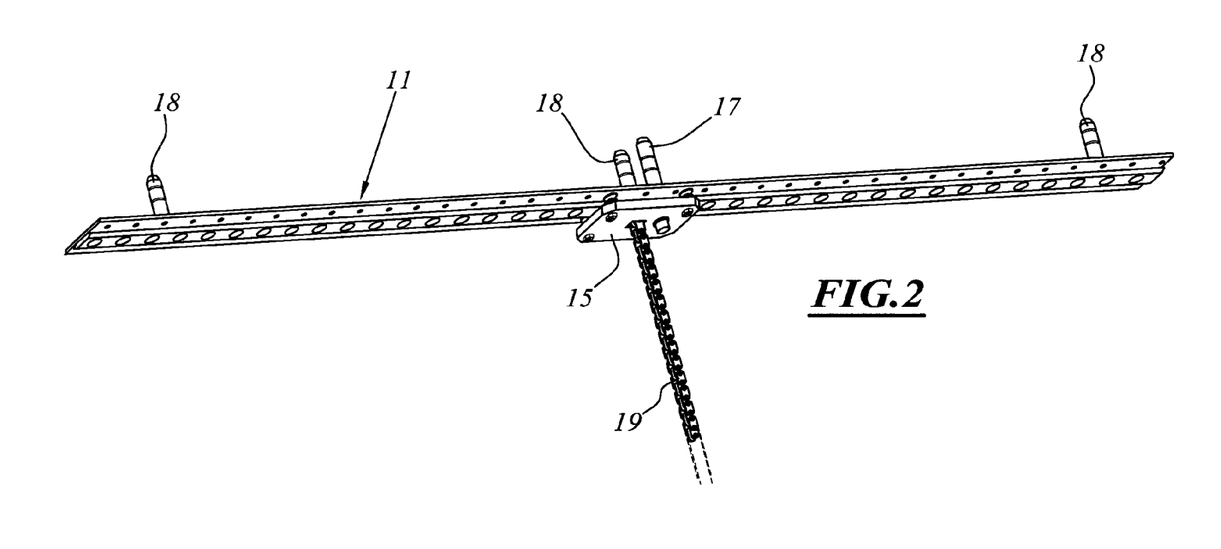
FIG. 2 is a schematic view in perspective of a ramp for inserting a robotic arm of the operating device.
Figure 3:
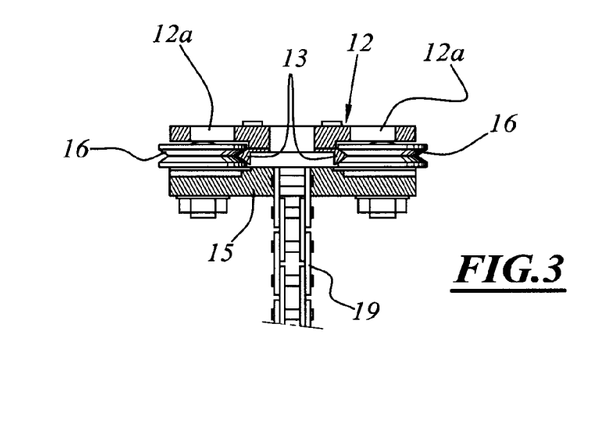
FIG. 3 is a schematic view in perspective of a rail and of a trolley for supporting and moving the robotic arm.

As shown in FIGS. 1 to 3, the operating device comprises at least one rail 11 furnished with members 18 for attachment beneath the tube plate 5.

As shown in FIGS. 2 and 3, the rail 11 is formed of a soleplate 12 intended to be applied to the bottom face of the tube plate 5 and a runway 13 that is supported by the soleplate 12 and on which at least one trolley 15 moves. The runway 13 extends along the whole length of the soleplate 12 of the rail 11 and has, on each of its longitudinal edges, a V-shaped profile intended to interact with running rollers 16 carried by the trolley 15 and of a shape matching the longitudinal edges of the runway 13.

In the exemplary embodiment shown in FIGS. 2 and 3, the rollers 16 each have the shape of a dual wheel.

Preferably, the rail 11 is formed of two portions of rail in order to make them easier to insert into the water chamber 7 through the entry hatch 9 and each rail 11 comprises members for attachment beneath the tube plate 5.

These attachment members preferably comprise a temporary retaining clamp 17 and three retaining clamps 18 distributed along the whole length of the soleplate 12 of the rail 11 as shown in FIG. 2. The temporary retaining clamp 17 also makes it possible to lock the trolley 15 onto the rail 11 and this temporary retaining clamp 17 and the retaining clamps 18 are of the conventional type and each comprise tubular casings that can be expanded radially and that each have a nominal external diameter very slightly less than the internal diameter of the vertical holes 4. The expansion of the tubular casings of the clamps 17 is preferably controlled manually and that of the clamps 18 is operable from the outside of the water chamber 7 by an operating member of an appropriate and known type.

The temporary retaining clamp 17 makes it possible to hold the rail 11 on the bottom face of the tube plate 5 while the rail 11 is coupled by means of the retaining clamps 18.

The rail 11 may comprise several trolleys 15 for the support and movement of two different elements, as will be seen later.

As shown in FIG. 2, the trolley or trolleys 15 are fitted with a pendular lifting means 19 formed by a chain or a cable or by any other appropriate member of a known type.

The operating device also comprises a robotic arm indicated in its entirety by the general reference number 20. This robotic arm 20 of the industrial type comprises several arm elements 21 articulated with one another to allow the free end 22 to move about covering 360° in the space. The free end 22 of the robotic arm 20 is provided with means of attaching operating tools in the water chamber 7 or viewing or inspection members appropriate to the operation to be carried out.

Figure 5:
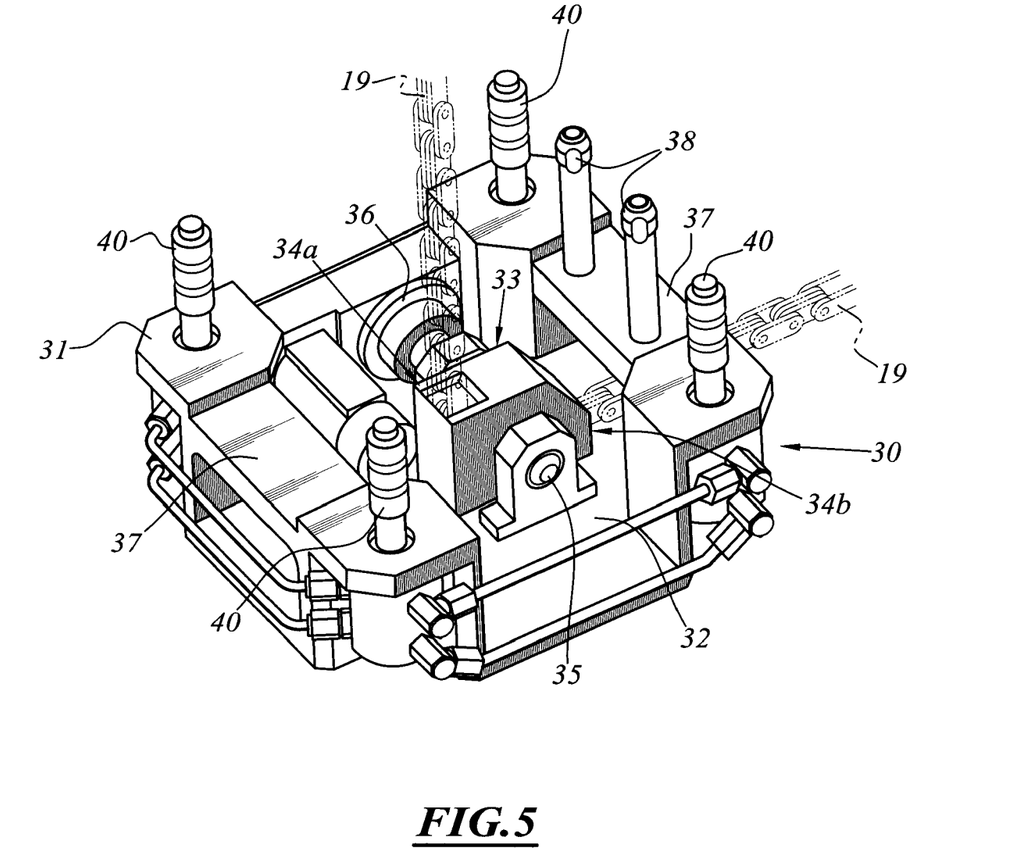
FIG. 5 is a schematic view in perspective of a base for attachment of the robotic arm to the tube plate.

The robotic arm 20 comprises a base 30 for attachment beneath the tube plate 5 and, as shown in FIG. 5, this attachment base 30 is formed by a bearing plate 31 of generally parallelepipedic shape. The bearing plate 31 of the base 30 for attachment beneath the tube plate 5 comprises a central housing 32 in which is placed a drive means 33 interacting with the lifting means 19 so as to draw the base 30 against the said tube plate. The drive means 33 is formed by a wheel, not shown, placed in a box 34 and this wheel is supported by a shaft 35 rotated by a reducing gear 36 protected by a torque limiter not shown. This wheel is fitted with members for engagement with the lifting means 19 and if this lifting means 19 is formed by a chain, the wheel is a gear wheel. For this purpose, the box 34 comprises an opening 34a for the chain 19 to go in and an opening 34b for this chain 19 to go out.

Furthermore, the bearing plate 31 comprises, on two of its opposite sides, a recess 37 for positioning the rail 11. At least one of the recesses 37 is fitted with two indexing posts 38. These indexing posts 38 are of a known type and each comprises a spring, not shown, allowing them, either side of the runway 13, to press on the bottom face of the soleplate 12 which has holes 12a corresponding with the predetermined holes 4 of the tube plate 5. The bearing plate 31 also comprises at least two hydraulic retaining clamps 40, of a known type, each intended to penetrate into a vertical hole 4 of the tube plate 5 in preference and, as shown in FIG. 5, the bearing plate 31 is provided with four hydraulic retaining clamps 40 each placed at a corner of this bearing plate 31. These retaining clamps 40 are of a known type and each comprises a radially expandable tubular casing so that each is attached inside a vertical hole 4 to hold the base 30 and the robotic arm beneath the tube plate 5 inside the water chamber 7.

In order to make it easier to insert the robotic arm 20 into the water chamber 7, the device comprises a ramp 50 (FIGS. 1 and 4) for supporting and inserting this robotic arm 20. This ramp 50 is movable and is provided with elements 51 for attachment to the outer periphery of the entry hatch 9 and comprises a plate 52 for supporting the robotic arm 20 whose base 30 is placed facing the entry hatch 9. This trolley 52 can be moved on the ramp 50.

The device also comprises at least one second trolley 15 that can be moved on the rail 11 and is identical to the first trolley 15.

Figure 6:
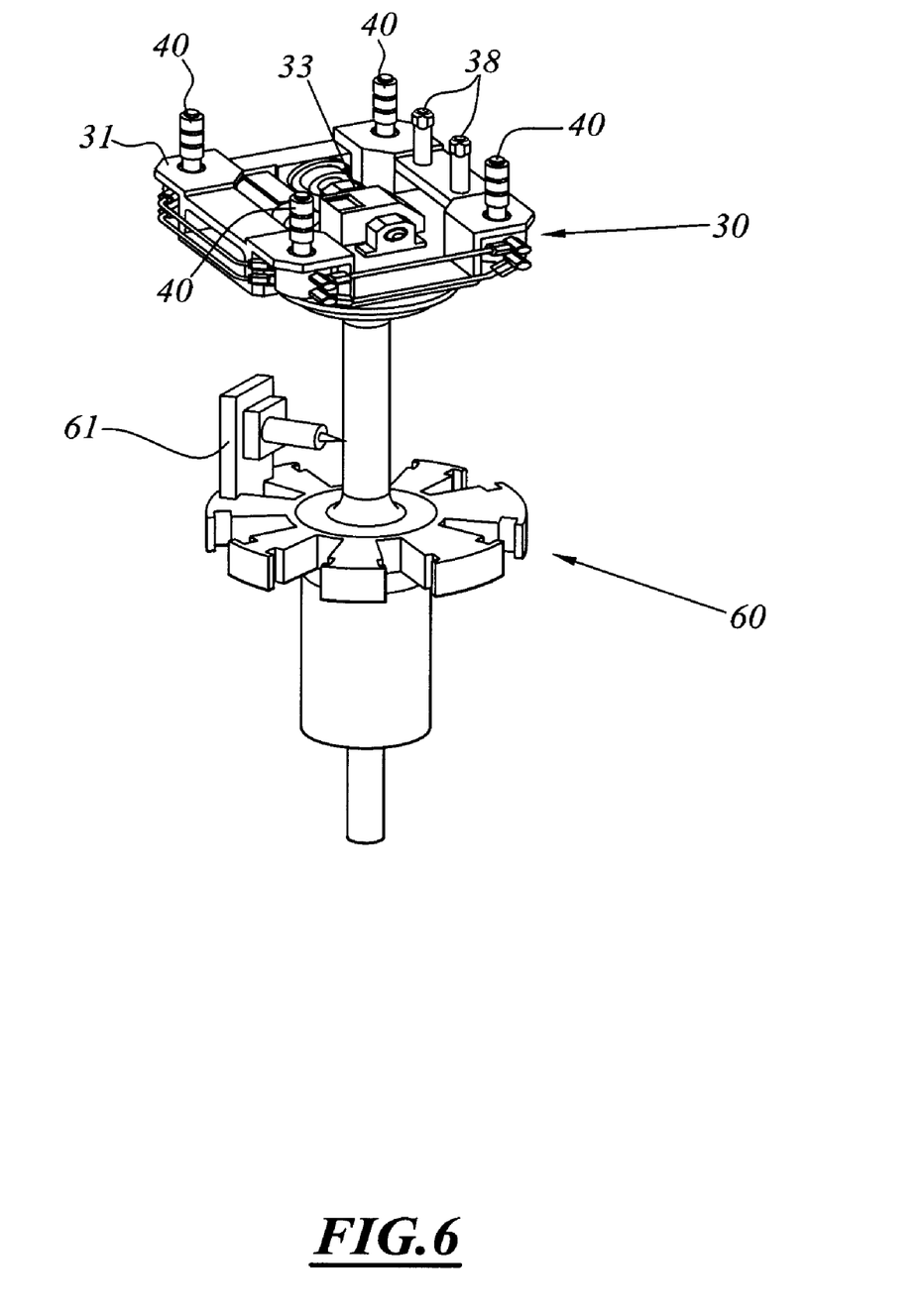
FIG. 6 is a schematic view in perspective of an example of a tool-carrier for the robotic arm.
Figure 7:
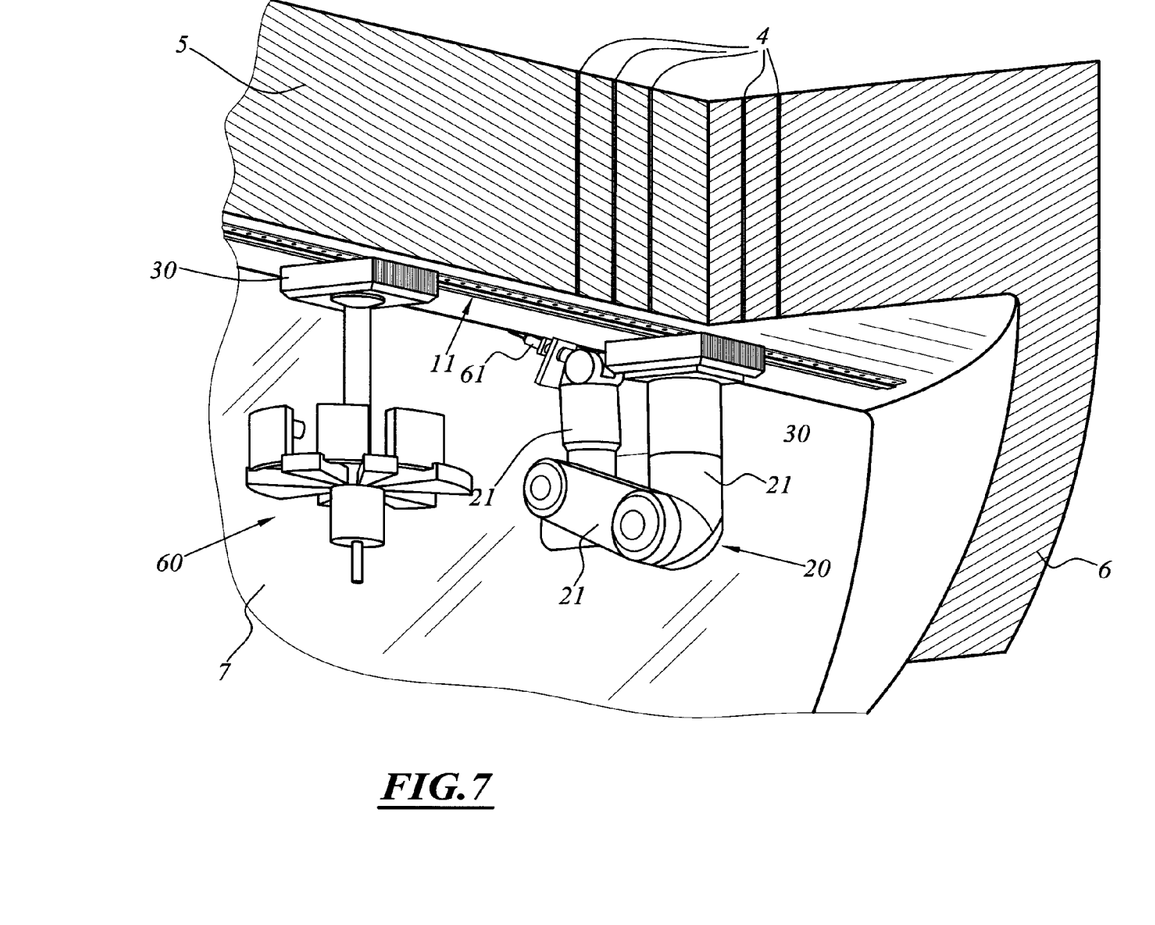
FIG. 7 is a partial schematic view in perspective of the steam generator water chamber fitted with the operating device according to the invention.

As shown in FIG. 6, the device also comprises a tool-carrier 60 comprising an attachment base 30 identical to the attachment base 30 of the robotic arm 20. This attachment base is furnished with two indexing posts 38, members 40 for coupling beneath the tube plate 5 either side of the rail 11 and a drive means 33 with the lifting means 19 to draw the attachment base 30 of the tool-carrier 60 against the tube plate 5. In a conventional manner, the tool-carrier 60 comprises slots each intended to receive a tool 61 suitable for the work to be done by the robotic arm. This tool may be, for example, a member for inspecting or a member for viewing or a member for machining a part inside the water chamber 7.

The operating device 10 is placed inside the water chamber 7 in the following manner.

First of all, an operator situated in this water chamber 7 receives, through the entry hatch 9, the first rail 11 onto which a trolley 15 is locked thanks to the temporary clamp 17. The operator holds this rail 11 on the lower face of the tube plate 5 with the aid of this clamp 17, while screwing to a determined torque into the vertical holes 4 the retaining clamps 18 at each end of the rail 11. The operator then removes the temporary clamp 17 releasing the trolley 15 and locks the retaining clamp 18 situated substantially in the centre of the rail 11. Then, he carries out the same operation with the second rail 11 so that the rails 11 form a continuous runway. The rails 11 therefore comprise two trolleys 15 from each of which a chain 19 hangs inside the water chamber 7.

Figure 4:
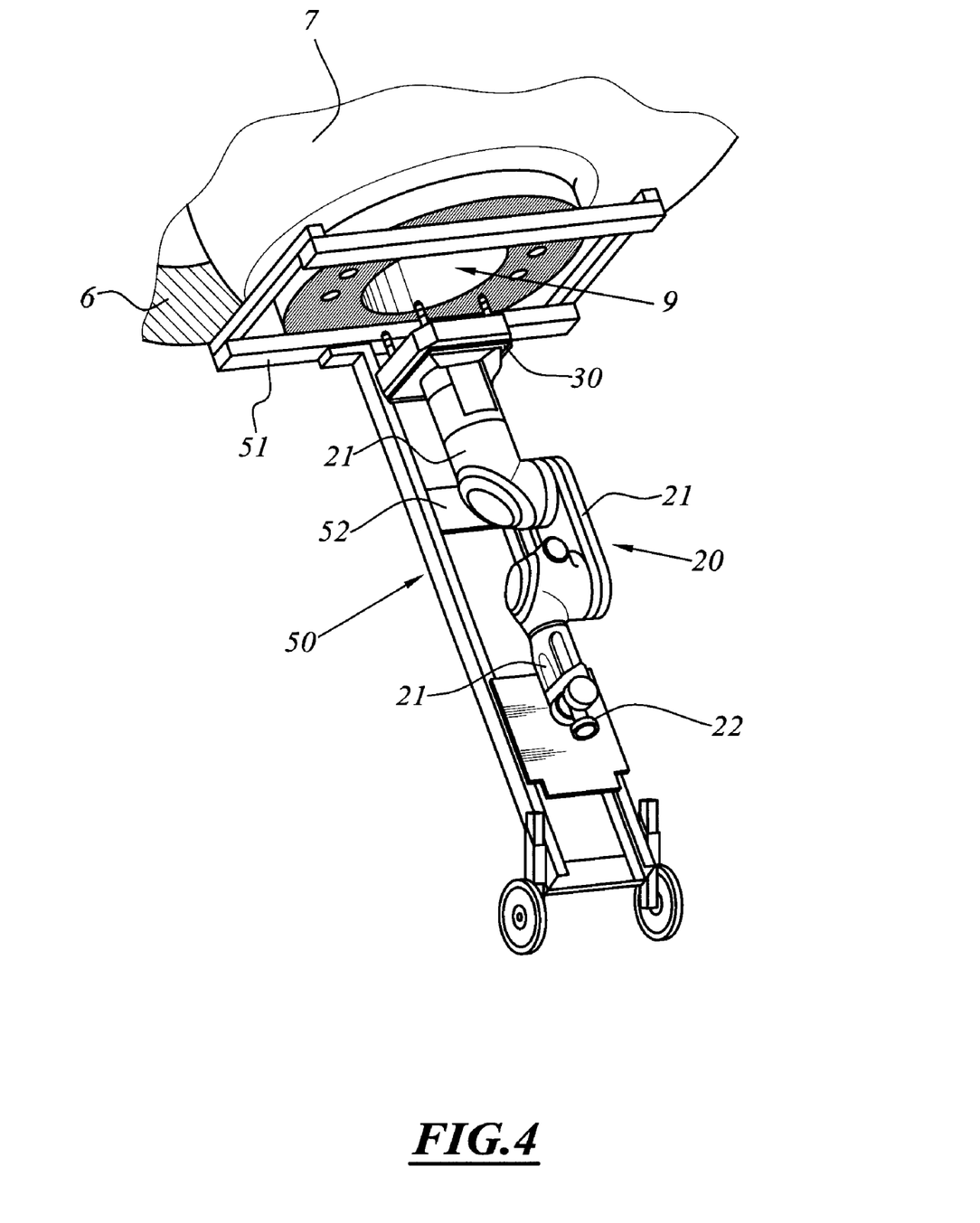
FIG. 4 is a schematic view in cross section of the rail and the trolley of FIG. 3.

Then, the operator, placed outside the water chamber, clamps the ramp 50 to the outer edge of the entry hatch 9 via the attachment elements 51. As shown in FIG. 4, the trolley 52 of the ramp 50 supports the robotic arm 20, the attachment base 30 of this robotic arm being placed facing the entry hatch 9.

The operator inserts the free end of a chain 19 into the opening 34a of the drive means 33 supported by the base 30 of the robotic arm 20 and engages this chain 19 with the gear wheel of this drive means 33. The end of the chain comes out through the exit opening 34b. The gear wheel of the drive means 33 is driven by the reducing gear 36.

The trolley 52 moves on the ramp 50 thanks to a winch, not shown, in order to insert the robotic arm 20 up to its first articulation inside the water chamber 7. The robotic arm 20 is then folded to make it easier to insert it into the water chamber 7. The trolley 15 being able to move freely in translation on the runway 13 of the rail 11, this trolley 15 comes to the same level as the shaft of the robotic arm and, once inside the said water chamber 7, the robotic arm 20 is folded to prevent it butting against the walls of the water chamber 7 and so that it is in position to find the point of equilibrium in order to have the top face of the attachment base 30 parallel with the tube plate 5.

The robotic arm 20 is then raised by means of the chain 19 and the gear wheel of the drive means 33 until the two sprung indexing posts 38 press against the bottom face of the soleplate 12 either side of the runway 13 in order to achieve a lateral positioning. The robotic arm 20 is moved on the rail 11 by an operator from outside the water chamber 7 by means of a pole so that the indexing posts 38 are placed in holes 12a of the soleplate 12. The robotic arm is hoisted again by means of the chain 19 and the gear wheel of the drive means 33 so that the bearing surfaces of the plate 31 of the attachment base 30 are in contact with the bottom face of the tube plate 5. The retaining clamps 40 each come to position themselves in a vertical hole 4 of this tube plate 5 as do the indexing posts 38. The correct flattening of the attachment base 30 is controlled by two movement sensors, not shown. When this attachment base 30 is pressed flat against the bottom face of the tube plate 5, the robotic arm 20 is locked onto the said tube plate 5 by means of the hydraulic retaining clamps 40.

Thus, the robotic arm 20 is attached to a predetermined position beneath the tube plate 5.

The operator carries out the same operations to also attach the tool-carrier 60 beneath the tube plate 5 by means of its attachment base 30.

The operator remotely controls the robotic arm 20 from outside the water chamber 7 so that he carries out the various operations using the tools 61 carried by the tool-carrier 60, such as for example operations of inspection, viewing or else machining operations.

Once the robotic arm 20 has performed these operations in a determined zone of the water chamber 7, the robotic arm 20 can be disconnected from the tube plate 5 and lowered by means of the chain 19 interacting with the gear wheel of the drive means 33 and moved by means of the trolley 15 to a new predetermined position to carry out a new series of operations inside the water chamber 7.

These operations can be carried out without requiring operators to be present at any time inside the water chamber of the steam generator.

Specifically, the insertion, placement and attachment of the robotic arm and of the tool-carrier inside the water chamber may be carried out entirely from outside this water chamber.

The invention claimed is:

1. Device for operating in a water chamber of a heat exchanger comprising a wall of substantially hemispherical shape comprising at least one entry hatch, wherein the device comprises:
    at least one rail including attachment members configured to attach to and suspend the at least one rail from a bottom face of a tube plate which delimits the upper portion of the wall of substantially hemispherical shape, the at least one rail configured to support at least one trolley that can be moved along the at least one rail and fitted with a pendular lifting means, and
    a robotic arm comprising an attachment base furnished, on the one hand, with members for coupling on the bottom face of the tube plate either side of the said rail and, on the other hand, with a drive means interacting with the lifting means to draw the attachment base against the tube plate.

2. The device according to claim 1, wherein the said at least one rail comprises at least one second rail placed in the extension of the first rail and one second trolley that can be moved along the rail, and in that the device comprises a tool-carrier comprising an attachment base furnished, on the one hand, with members for coupling on the bottom face of the tube plate, either side of the said rail, and, on the other hand, a drive means interacting with the lifting means to draw the attachment base against the tube plate.

3. The device according to claim 1, wherein the said attachment members of the said at least one rail are formed by at least two retaining clamps each intended to be inserted into a vertical hole of the tube plate.

4. The device according to claim 1, wherein it comprises a movable ramp for inserting the robotic arm comprising elements for attachment on the outer periphery of the entry hatch and a plate for supporting the robotic arm whose attachment base is placed facing the entry hatch and can be moved on the said ramp.

5. The device according to claim 2, wherein the attachment base of the robotic arm and of the tool-carrier is formed by a bearing plate of generally parallelepipedic shape comprising a central housing of the drive means and, on two opposite sides, a recess for positioning the rail.

6. The device according to claim 5, wherein the bearing plate comprises, in at least one recess of one of its sides, two indexing posts each into a hole of the soleplate in correspondence with a vertical hole of the tube plate.

7. The device according to claim 1, wherein the coupling members of the robotic arm comprise at least two hydraulic retaining clamps each intended to be inserted into a vertical hole of the tube plate.

8. The device according to claim 5, wherein the coupling members of the bearing plate comprise four hydraulic retaining clamps each intended to be inserted into a vertical hole of the tube plate, each of the said clamps being placed on a corner of the bearing plate.

9. The device according to claim 1, wherein the pendular lifting means is formed by a chain or a cable.

10. The device according to claim 1, wherein the drive means is formed by a wheel rotated by a reducing gear and furnished with members for engagement with the lifting means.

11. The device according to claim 10, wherein the wheel is a gear wheel.

* * * * *